UNITED STATES PATENT OFFICE 2,335,652

VINYL ESTERS

Gaetano F. D'Alelio, Pittsfield, Mass., assignor to General Electric Company, a corporation of New York No Drawing. Application February 17, 1942, Serial No. 431,291

7 Claims. (Cl. 260—473)

This invention relates to new chemical compounds and more particularly to vinyl esters. The invention especially is concerned with the production of new and useful vinyl esters of halophenoxy substituted aliphatic monocarboxylic acids.

The vinyl esters of this invention may be represented graphically by the following general formula I 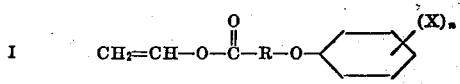

In the above formula X is a halogen selected from the class consisting of chlorine and bromine, $n$ is an integer which is at least one and not more than five, R is a divalent aliphatic hydrocarbon radical, such as, for example, methylene, ethylene, ethylidene, propylene, proylidene, tetramethylene, butylidene, methyl ethylene, ethyl ethylene, pentamethylene, amylidene, methyl butylene, ethyl propylene, propyl ethylene, hexylene, decamethylene, etc. Although R may be any divalent aliphatic radical, for practical and economic reasons I prefer to prepare compounds in which R contains not more than six carbon atoms.

The new vinyl esters of this invention may be used in preparing intermediates generally useful in preparing other organic compounds, for example, halogenated addition derivatives useful in a variety of reactions. The new vinyl esters may also be used in preparing new polymers and copolymers with other known polymerizable compounds. Thus they may be polymerized alone or copolymerized with other polymerizable compounds to yield products of particular utility in the plastics and coating arts. Such polymeric products are more fully disclosed and claimed in my copending application Serial No. 431,290, filed concurrently herewith and assigned to the same assignee as the present invention.

Various methods may be employed to produce the chemical compounds of this invention. One method comprises effecting reaction between a halo-phenoxy substituted aliphatic acid and acetylene in the presence of a mercuric salt. This reaction may be represented by the following general equation II 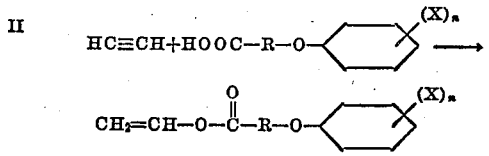

In the above equation R, X and $n$ have the same meaning as given above with reference to the general Formula I for the vinyl esters of this invention.

Another method comprises the reaction of a vinyl ester of a halogenated aliphatic acid and an alkali metal salt of a halogenated phenol. This reaction is preferably carried out in an ethyl alcohol solution or in a mixture of ethyl alcohol and water depending on the solubility of the vinyl ester. This reaction may be represented by the following general formula III 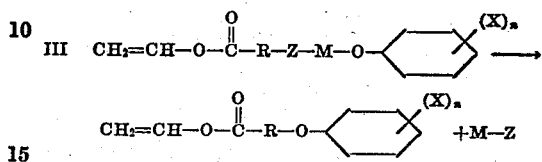

In the above Formula Z represents a halogen selected from the class consisting of chlorine, bromine and iodine, M represents an alkali metal and R, X and $n$ have the same meaning as given above with reference to the general Formula I for the vinyl esters of this invention.

Still another method comprises the reaction of a vinyl ester, e. g., vinyl acetate, and a halophenoxy substituted aliphatic acid. This reaction involves an interchange of the acid radicals of the vinyl ester and the aliphatic acid. This reaction may be represented by the following general equation IV 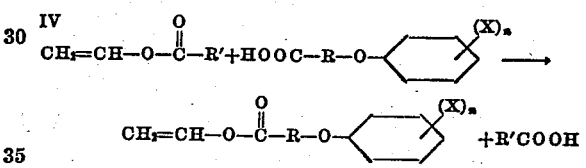

In the above equation R' represents a monovalent lower aliphatic radical; R, X, and $n$ have the same meaning as given above with reference to the general Formula I for the vinyl esters of this invention.

Illustrative examples of halo-phenoxy substituted aliphatic acids which may be used in the methods illustrated by general Formulas II and IV are:

Monochloro-phenoxy acetic
Monobromo-phenoxy acetic
Dichloro-phenoxy acetic
Dibromo-phenoxy acetic
Trichloro-phenoxy acetic
Tribromo-phenoxy acetic
Tetrachloro-phenoxy acetic
Tetrabromo-phenoxy acetic
Pentachloro-phenoxy acetic
Pentabromo-phenoxy acetic
Monochloro-phenoxy propionic
Dibromo-phenoxy propionic
Trichloro-phenoxy butyric
Tetra bromo-phenoxy valeric
Pentachloro-phenoxy hexanoic and examples of vinyl esters of halogenated aliphatic acids which may be used in the method illustrated by general Formula III are:

Vinyl chloroacetate
Vinyl bromoacetate
Vinyl chloropropionate
Vinyl bromobutyrate
Vinyl chloro valerate Illustrative examples of the alkali metal salts of a halogenated phenol which may be used in the method illustrated by the general Formula III are the sodium, potassium, lithium, rubidium, and caesium salts of: mono-, di-, tri-, tetra-, and pentachloro-phenol and mono-, di-, tri-, tetra-, and pentabromo-phenol while examples of vinyl esters that may be used in the method illustrated by the general Formula IV are:

Vinyl acetate
Vinyl propionate
Vinyl butyrate
Vinyl valerate
Vinyl isobutyrate

In order that those skilled in the art better may understand how the present invention may be carried into effect the following illustrative examples thereof are given. All parts are by weight.

Example 1

| | Parts |
|---|---|
| Vinyl acetate (inhibited with copper acetate) | 273 |
| Para-chloro-phenoxy acetic acid | 223 |
| Mercuric acetate | 4.5 |
| Concentrated sulfuric acid | 0.78 |

The above mixture is heated in a flask equipped with a reflux condenser for eight hours at the reflux temperature of the mass. After cooling to room temperature, 200 parts of ether are added and the insoluble matter filtered off. The residue is washed with two portions of 50 parts ether which are added to the original filtrate. The acid constituents are removed from the filtrate by washing with five portions of 200 parts water and then with a 2% aqueous solution of sodium carbonate solution until the ether solution tests neutral to moist litmus paper. The ether solution is again washed with water and dried for 15 hours over anhydrous calcium chloride. After filtering off the calcium chloride, copper powder is added and the ether removed by distillation at atmospheric pressure. The residue is distilled in a nitrogen atmosphere under vacuum. After redistilling, a yield of 44.5 parts of vinyl para-chloro-phenoxy acetate (B.P.$_{2mm}$—125–128° C., $d_{20°}$—1.237, $n^D_{20°}$—1.5335)

is obtained.

Example 2

Following the procedure of Example 1 vinyl monobromo-phenoxy acetate may be prepared by using 356.5 parts of monobromo-phenoxy acetic acid in place of 223 parts of the para-chlorophenoxy acetic acid.

Example 3

Vinyl dichloro-phenoxy acetate may be prepared by using 326 parts of dichloro-phenoxy acetic acid in place of 223 parts of the para-chloro-phenoxy acetic acid and proceeding in a manner similar to that described under Example 1.

Example 4

Using the procedure described under Example 1 vinyl monochloro-phenoxy propionate may be prepared by using 265 parts monochloro-phenoxy propionic acid in place of 223 parts of the para-chlorophenoxy acetic acid.

Further examples of other new compounds of this invention are:

Vinyl trichloro-phenoxy acetate
Vinyl tetrabromo-phenoxy acetate
Vinyl pentachloro-phenoxy acetate
Vinyl monobromo-phenoxy propionate
Vinyl dichloro-phenoxy butyrate
Vinyl meta-chloro-phenoxy valerate
Vinyl ortho-chloro-phenoxy hexanoate
Vinyl dichloro-phenoxy beta-ethyl propionate
Vinyl trichloro-phenoxy isobutyrate

What I claim as new and desire to secure by Letters Patent of the United States is:

1. Chemical compounds corresponding to the general formula

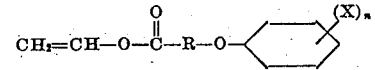

where R is a divalent aliphatic hydrocarbon radical, X is a halogen selected from the class consisting of chlorine and bromine and $n$ is an integer which is at least one and not more than five.

2. Chemical compounds as in claim 1 wherein R is a divalent aliphatic radical having not more than six carbon atoms.

3. Chemical compounds as in claim 1 wherein R is a divalent organic radical having not more than six carbon atoms and $n$ is an integer which is at least one and not more than three.

4. Vinyl monochloro-phenoxy acetate.
5. Vinyl para-chloro-phenoxy acetate.
6. Vinyl dichloro-phenoxy acetate.
7. Vinyl monochloro-phenoxy propionate.

GAETANO F. D'ALELIO.

Certificate of Correction

Patent No. 2,335,652.    November 30, 1943.

GAETANO F. D'ALELIO

It is hereby certified that error appears in the printed specification of the above numbered patent requiring correction as follows: Page 1, second column, line 11, for that portion of the formula reading $$\text{"}R-Z-M-O\text{"}$$

read $$R-Z+M-O$$

and that the said Letters Patent should be read with this correction therein that the same may conform to the record of the case in the Patent Office.

Signed and sealed this 1st day of February, A. D. 1944.

[SEAL]

HENRY VAN ARSDALE,
*Acting Commissioner of Patents.*